United States Patent
Damnjanovic et al.

(10) Patent No.: US 10,631,173 B2
(45) Date of Patent: Apr. 21, 2020

(54) RADIO (NR) PROCEDURES FOR SHARED SPECTRUM

(71) Applicant: QUALCOMM Incorporated, San Diego, CA (US)

(72) Inventors: Aleksandar Damnjanovic, Del Mar, CA (US); Juan Montojo, San Diego, CA (US); Siddhartha Mallik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/623,102

(22) Filed: Jun. 14, 2017

(65) Prior Publication Data

US 2018/0070242 A1    Mar. 8, 2018

Related U.S. Application Data

(60) Provisional application No. 62/383,064, filed on Sep. 2, 2016.

(51) Int. Cl.
| | | |
|---|---|---|
| H04W 16/14 | (2009.01) | |
| H04W 74/08 | (2009.01) | |
| H04W 76/11 | (2018.01) | |

(52) U.S. Cl.
CPC ....... *H04W 16/14* (2013.01); *H04W 74/0808* (2013.01); *H04W 76/11* (2018.02)

(58) Field of Classification Search
None
See application file for complete search history.

(56) References Cited

U.S. PATENT DOCUMENTS

2009/0196162 A1    8/2009 Sambhwani et al.
2009/0257398 A1*  10/2009 Koyanagi ............. H04W 48/18
                                                                370/331

(Continued)

FOREIGN PATENT DOCUMENTS

WO    WO-2008052012 A2    5/2008
WO       2015101974 A1    7/2015

OTHER PUBLICATIONS

International Search Report and Written Opinion—PCT/US2017/049711—ISA/EPO—dated Mar. 29, 2018.

(Continued)

*Primary Examiner* — Ajit Patel
(74) *Attorney, Agent, or Firm* — Patterson & Sheridan, LLP

(57) ABSTRACT

Certain aspects of the present disclosure provide techniques for protecting overhead and common channel transmissions in a NR shared spectrum system. A BS of a first operator may receive information regarding at least one overhead transmission associated with a wireless device of a second operator and may protect one or more overhead signal transmissions of the wireless device based, at least in part, on the received information. A UE may detect information associated with at least one overhead transmission from a wireless device associated with a first operator and may transmit the information regarding the detected overhead transmission to a BS associated with a second operator. A UE served by a BS associated with a first operator may detect a wireless device (e.g., another UE or a BS) associated with a second operator. The UE may report an identification of the wireless device to the BS.

14 Claims, 11 Drawing Sheets

(56) References Cited

U.S. PATENT DOCUMENTS

| | | | |
|---|---|---|---|
| 2010/0189023 A1* | 7/2010 | Lindgren | H04W 52/0206 370/311 |
| 2010/0197308 A1* | 8/2010 | Racz | H04W 36/0055 455/436 |
| 2011/0249627 A1 | 10/2011 | Stanwood et al. | |
| 2012/0063381 A1* | 3/2012 | Huang | H04W 72/005 370/312 |
| 2012/0304213 A1 | 11/2012 | Lee et al. | |
| 2015/0215471 A1 | 7/2015 | Ljung | |
| 2015/0245411 A1 | 8/2015 | Damnjanovic et al. | |
| 2015/0341878 A1* | 11/2015 | Lee | H04W 56/004 370/329 |
| 2015/0351121 A1 | 12/2015 | Luo et al. | |
| 2016/0014779 A1 | 1/2016 | Hu et al. | |
| 2016/0057770 A1 | 2/2016 | Yerramalli et al. | |
| 2016/0212607 A1* | 7/2016 | Trichias | H04W 4/90 |
| 2016/0270100 A1* | 9/2016 | Ng | H04L 1/1887 |
| 2016/0330641 A1* | 11/2016 | Zhang | H04W 24/02 |
| 2016/0330676 A1* | 11/2016 | Thangarasa | H04W 76/14 |
| 2017/0019909 A1* | 1/2017 | Si | H04L 47/27 |
| 2017/0034825 A1* | 2/2017 | Harada | H04W 72/0453 |
| 2017/0311191 A1* | 10/2017 | Khawer | H04W 16/14 |
| 2018/0020356 A1* | 1/2018 | Gu | H04W 16/06 |
| 2018/0020462 A1* | 1/2018 | Xiong | H04W 72/1215 |
| 2018/0027538 A1* | 1/2018 | Uchiyama | H04W 72/0406 370/329 |
| 2018/0035369 A1* | 2/2018 | Hahn | H04W 24/10 |
| 2018/0124749 A1* | 5/2018 | Park | H04W 72/042 |
| 2018/0146404 A1* | 5/2018 | Zhang | H04W 48/12 |
| 2018/0152925 A1* | 5/2018 | Nammi | H04W 72/0453 |
| 2018/0213494 A1* | 7/2018 | Lu | H04L 27/2692 |

OTHER PUBLICATIONS

Partial International Search Report—PCT/US2017/049711—ISA/EPO—dated Nov. 22, 2017

* cited by examiner

RADIO (NR) PROCEDURES FOR SHARED SPECTRUM

CROSS-REFERENCE TO RELATED APPLICATIONS

This application claims priority to U.S. Provisional Application Ser. No. 62/383,064, entitled "NEW RADIO (NR) PROCEDURES FOR SHARED SPECTRUM," filed on Sep. 2, 2016, which is expressly incorporated by reference herein in its entirety.

INTRODUCTION

Aspects of the present disclosure relate to wireless communications systems and, more particularly, to procedures for protecting transmissions in a shared spectrum.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

As the demand for mobile broadband access continues to increase, using shared radio frequency spectrum (SRFS), which may include unlicensed radio frequency spectrum (URFS), has been considered to help solve the spectrum congestion problem for future wireless needs, not only to meet the growing demand for mobile broadband access, but also to advance and enhance the user experience with mobile communications. However, the SRFS may carry other transmissions, and therefore techniques such as listen before talk (LBT) and clear channel assessment (CCA) may be used in an effort prevent excessive interference. In certain scenarios, wireless devices operating in a shared spectrum may be asynchronous. It may be desirable to mitigate interference caused by wireless devices operating in the scared spectrum.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for protection of certain transmission in a shared spectrum are described herein. According to aspects of the present disclosure, at transmitter may refrain from transmitting or transmit at a lower transmit power when another transmitter is transmitting using overhead and/or common channels. The transmitter associated with a first operator may receive information associated with overhead transmissions from a UE, network server, or a BS associated with a second operator.

In an aspect, a method for wireless communication is provided. The method may be performed, for example, by a BS of a first operator. The method generally includes receiving information regarding at least one overhead transmission associated with a wireless device of a second operator and protecting one or more overhead signal transmissions of the wireless device based, at least in part, on the received information.

In an aspect, an apparatus for wireless communication by a BS of a first operator is provided. The apparatus includes means for receiving information regarding at least one overhead transmission associated with a wireless device of a second operator and means for protecting one or more overhead signal transmissions of the wireless device based, at least in part, on the received information.

In an aspect, an apparatus for wireless communication by a BS of a first operator is provided. The apparatus includes at least one processor and a memory coupled to the at least one processor. The at least one processor is configured to receive information regarding at least one overhead transmission associated with a wireless device of a second operator and protect one or more overhead signal transmissions of the wireless device based, at least in part, on the received information.

In an aspect, provide a computer readable medium for wireless communication by a BS of a first operator having computer-executable instructions stored thereon for receiving information regarding at least one overhead transmission associated with a wireless device of a second operator and protecting one or more overhead signal transmissions of the wireless device based, at least in part, on the received information.

In an aspect, a method for wireless communication by a UE is provided. The method include detecting information associated with at least one overhead transmission from a wireless device associated with a first operator and transmitting the information regarding the detected overhead transmission to a BS associated with a second operator.

In an aspect, an apparatus for wireless communication by a UE is provided. The method include means for detecting information associated with at least one overhead transmission from a wireless device associated with a first operator and means for transmitting the information regarding the detected overhead transmission to a BS associated with a second operator.

In an aspect, an apparatus for wireless communication by a UE is provided. The apparatus generally includes at least one processor and a memory coupled to the at least one processor. The at least one processor is configured to detect information associated with at least one overhead transmission from a wireless device associated with a first operator and transmit the information regarding the detected overhead transmission to a BS associated with a second operator.

In an aspect, provide a computer readable medium for wireless communication by a UE having computer-executable instructions stored thereon for detecting information associated with at least one overhead transmission from a wireless device associated with a first operator and transmitting the information regarding the detected overhead transmission to a BS associated with a second operator.

In an aspect, a method for wireless communication by a first UE served by a BS of a first operator is provided. The method includes detecting a wireless device of a second operator and reporting an identification associated with the wireless device to the BS.

In an aspect, an apparatus for wireless communication by a first UE served by a BS of a first operator is provided. The apparatus includes means for detecting a wireless device of a second operator and means for reporting an identification associated with the wireless device to the BS.

In an aspect, an apparatus for wireless communication by a first UE served by a BS of a first operator is provided. The apparatus includes at least one processor and a memory coupled to the at least one processor. The at least one processor is configured to detect a wireless device of a second operator and report an identification associated with the wireless device to the BS.

In an aspect, provide a computer readable medium for wireless communication by a first UE having computer-executable instructions stored thereon for detecting a wireless device of a second operator and reporting an identification associated with the wireless device to the BS.

Aspects of the present disclosure provide apparatus, methods, processing systems, and computer readable mediums for protecting certain transmissions of a transmitter, for example, in a shared spectrum.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
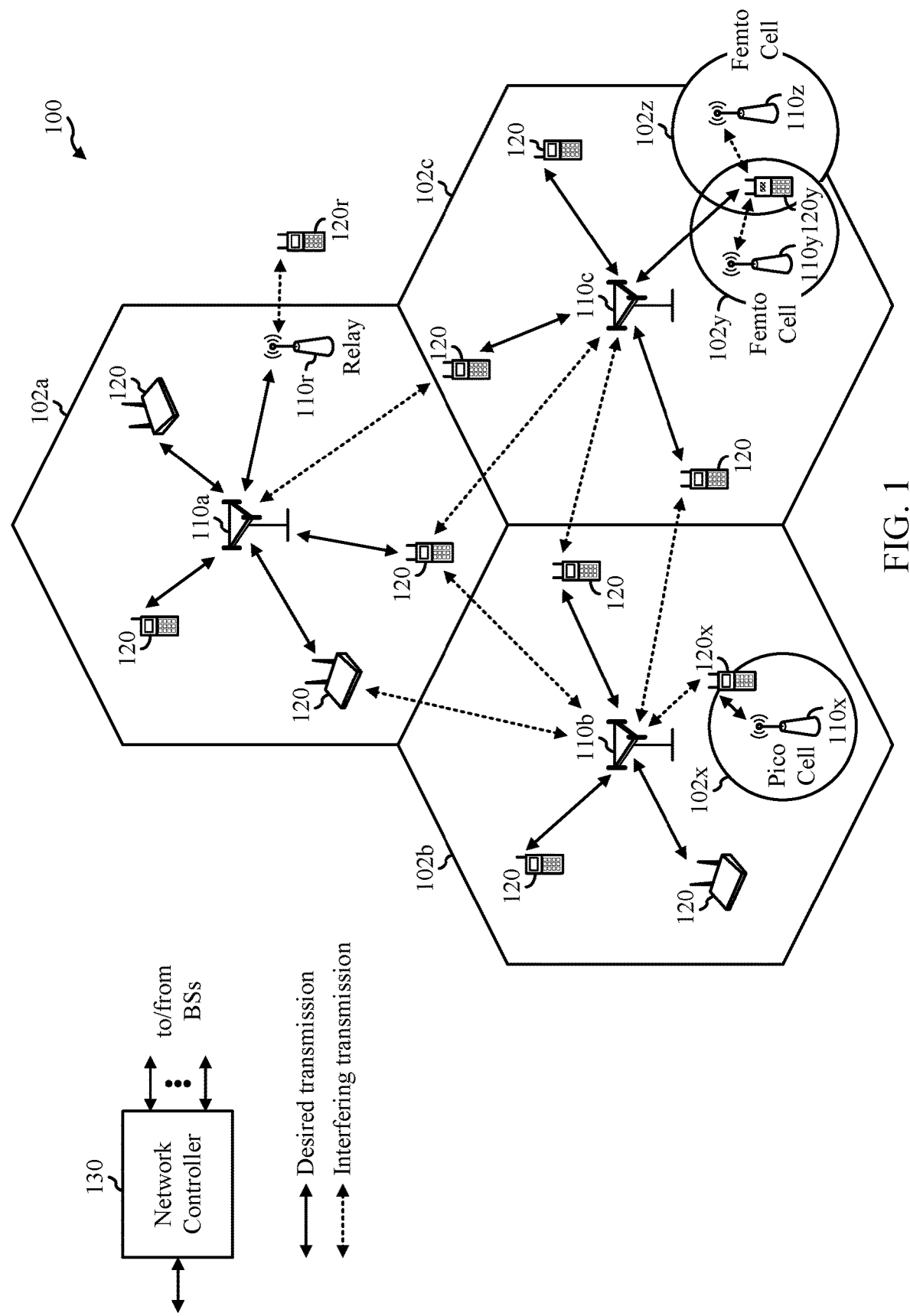
FIG. 1 is a block diagram conceptually illustrating an example telecommunications system, in accordance with certain aspects of the present disclosure.

Aspects of the present disclosure provide apparatus, methods, processing systems, and computer readable mediums for shared spectrum procedures. As described herein, according to aspects of the present disclosure, transmitters may not be discoverable or detected by each other. For example, a first BS may not detect a second BS; however, a UE may detect signals transmitted by both BSs. According to one example, the BSs may be associated with different operators.

In an effort to mitigate interference in a flexible NR system in which wireless devices may be asynchronous and may operate in a shared spectrum, a receiving device may detect information associated with an overhead transmission from a second transmitter associated with a second operator. The receiving device may transmit the information associated with the overhead transmission to a first transmitter, which may be associated with a first operator. The transmitter receiving the information associated with the overhead transmission (e.g., the first transmitter associated with the first operator) may protect one or more future overhead transmissions of the transmitter associated with the first operator.

As described herein, the first transmitter may receive information regarding overhead transmissions associated with a device of a second operator via a periodic network listen, from a UE, or a network server. A UE may advantageously (1) detect information associated with overhead transmissions and/or (2) detect a wireless device of a second operator. As described herein, this information assists a BS in protecting transmissions from the wireless device associated with the second operator.

As described herein, overhead transmission may refer to synchronization information, system information (e.g., associated with a network), control information, reference signals, and/or any other overhead signals. Overhead transmissions may refer to downlink or uplink transmissions. According to an example, overhead transmissions may be transmitted on an overhead channel or a common channel. According to an example, a clear channel assessment (CCA) exempt transmission (CET) is an example of an overhead transmission.

For illustrative purposes, aspects are described with reference to a BS serving as a transmitter and a UE serving as a receiver; however, aspects of the present disclosure are not so limited. For example, a UE associated with a first operator, acting as BS may receive information regarding at least one overhead transmission associated with a wireless device of a second operator. The UE acting as a BS may protect one or more overhead signals of the wireless device based, at least in part, on the received information.

According to aspects, on the downlink, a discovery signal or paging signal may be transmitted during a CCA exempt transmission (CET transmission), without a clear channel assessment (CCA). A discovery signal and paging signal are example of transmissions on common or overhead channels. As described herein, a transmitter may protect transmissions on common or overhead channels used by other transmitters. As described herein overhead transmissions may be protected, which refer to any non-data information. Examples over overhead transmissions include synchronization information, system information, control information, reference signals, and/or any other overhead signals.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using hardware, software/firmware, or combinations thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software/firmware, middleware, microcode, hardware description language, or otherwise.

Accordingly, in one or more exemplary embodiments, the functions described may be implemented in hardware, software/firmware, or combinations thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Aspects of the present disclosure may be used for new radio (NR) (new radio access technology or 5G technology). NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

FIG. 1 illustrates an example wireless network 100 in which aspects of the present disclosure may be implemented. For example, the wireless network may be a new radio (NR) or 5G network. A BS, for example a BS 110a, may be associated with a first operator. The BS 110a may be configured to perform operations 800 in FIG. 8 and methods described herein for protecting one or more overhead signal transmissions of a wireless device associated with a wireless device of a second operator. The wireless device may be a BS or a UE.

BS 110 may comprise a transmission gNB, reception point (TRP), Node B (NB), 5G NB, access point (AP), new radio (NR) BS, Master BS, primary BS, etc.). The NR network 100 may include the central unit.

Figure 9:
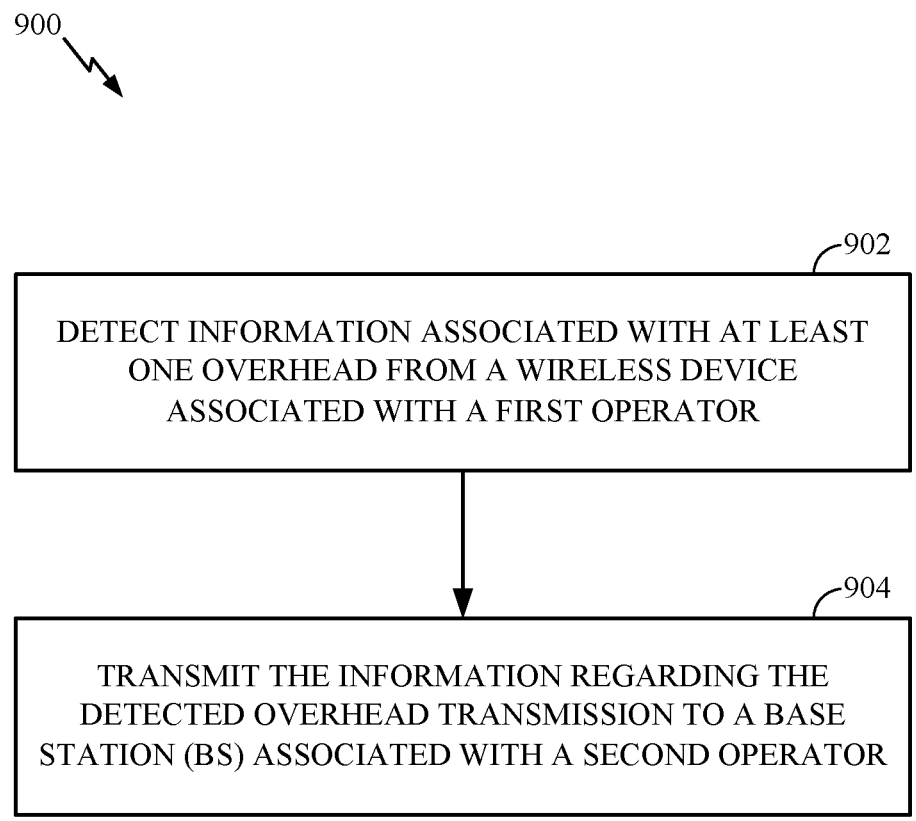
FIG. 9 illustrates example operations, which may be performed by a UE, in accordance with aspects of the present disclosure.
Figure 10:
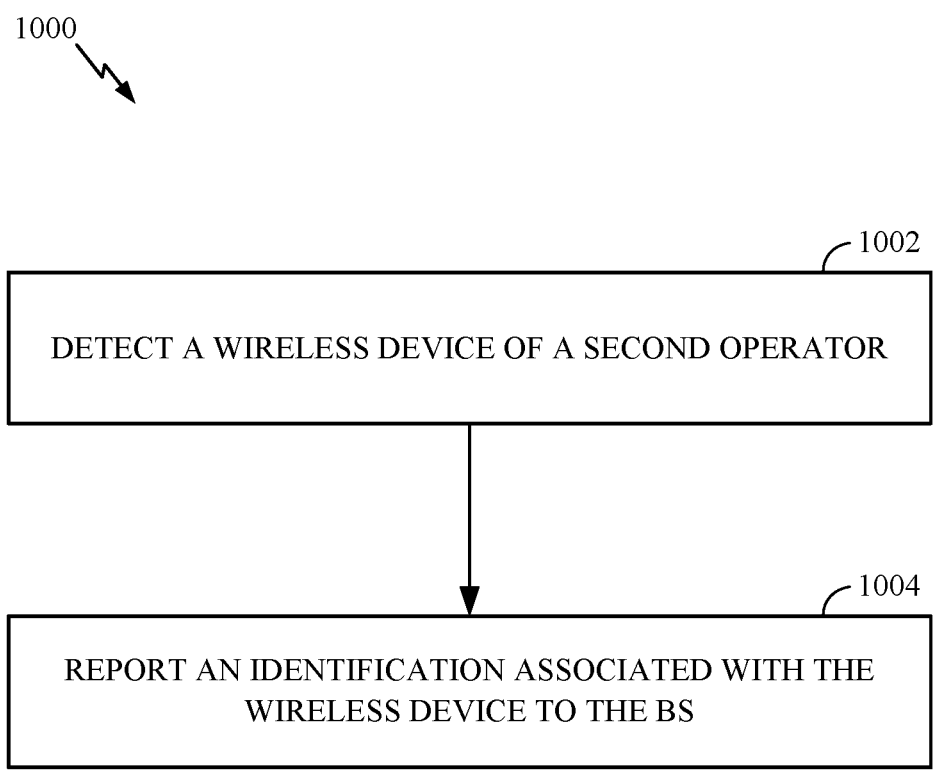
FIG. 10 illustrates example operations, which may be performed by a UE, in accordance with aspects of the present disclosure.

A UE 120 may perform the operations 900 illustrated in FIG. 9, operations 1000 illustrated in FIG. 10, and methods described herein for shared spectrum communication. The UE 120 may communicate with a first BS associated with a first operator and a second BS associated with a second operator.

As illustrated in FIG. 1, the wireless network 100 may include a number of BSs 110 and other network entities (or network elements). According to an example, the network entities including the BS and UEs may communicate on high frequencies (e.g., >6 GHz) using beams. One or more BS may also communicate at a lower frequency (e.g., <6 GHz). The one or more BS configured to operate in a high frequency spectrum and the one or more BS configured to operate in a lower frequency spectrum may be co-located.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6a and 6b. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
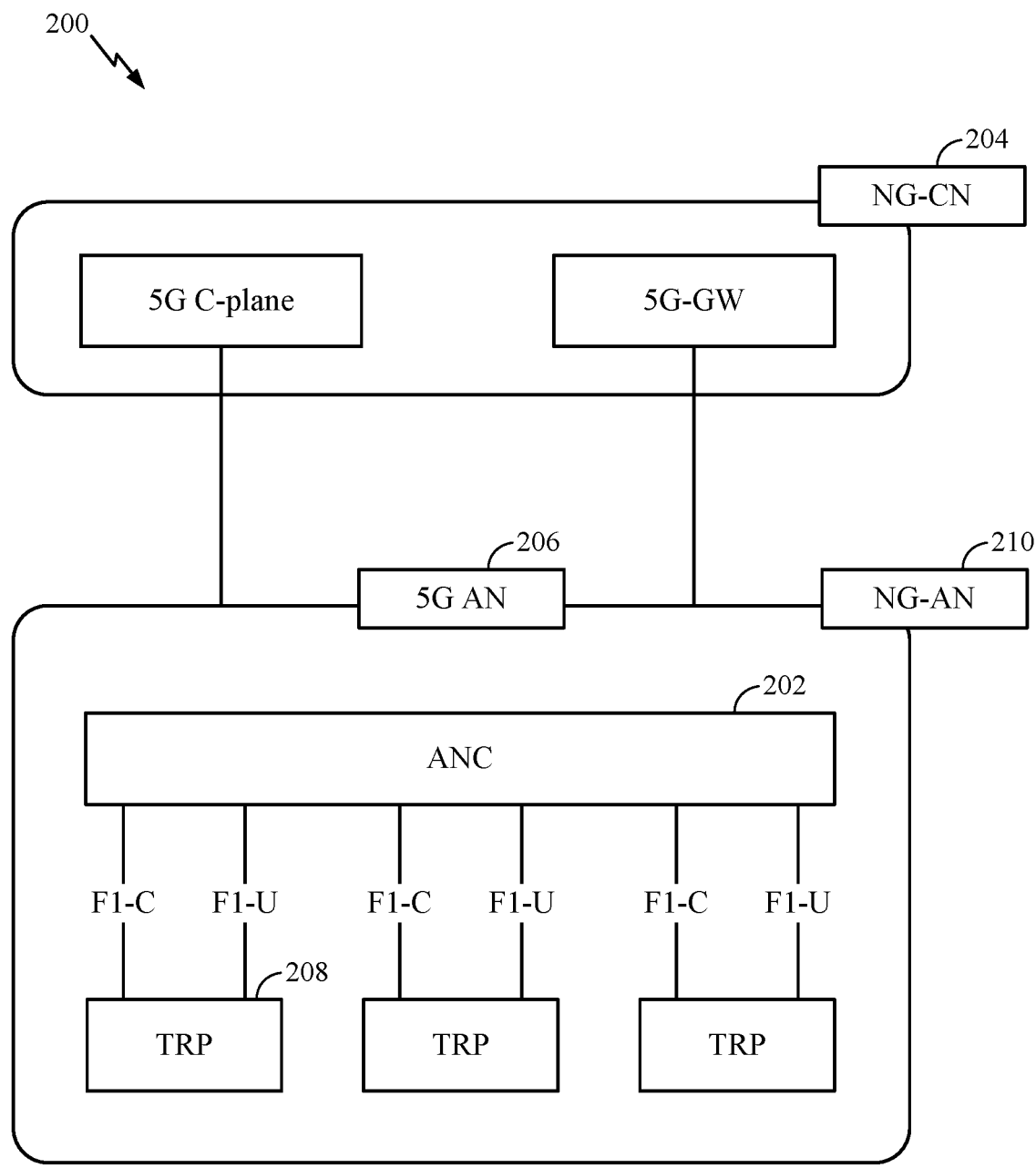
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
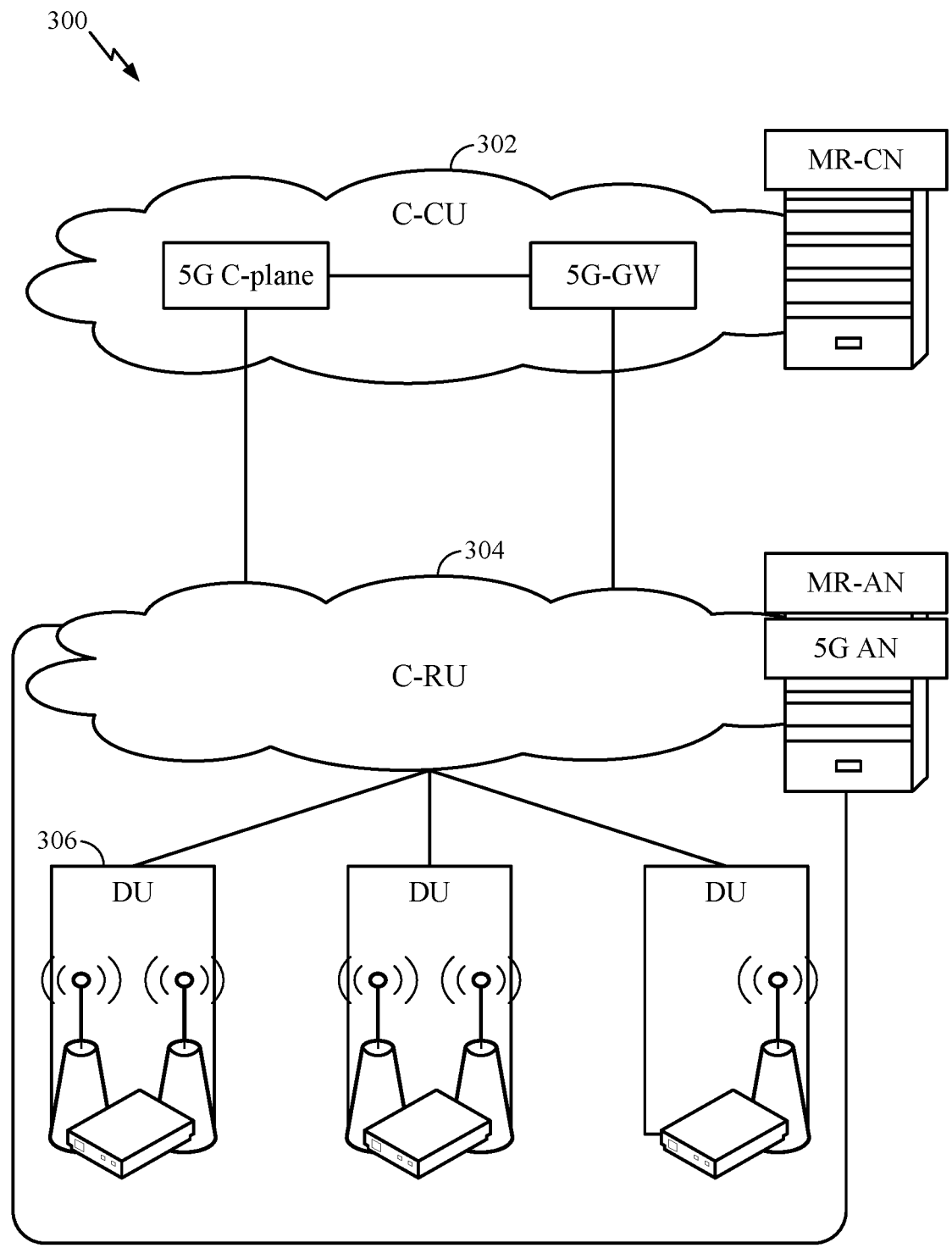
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
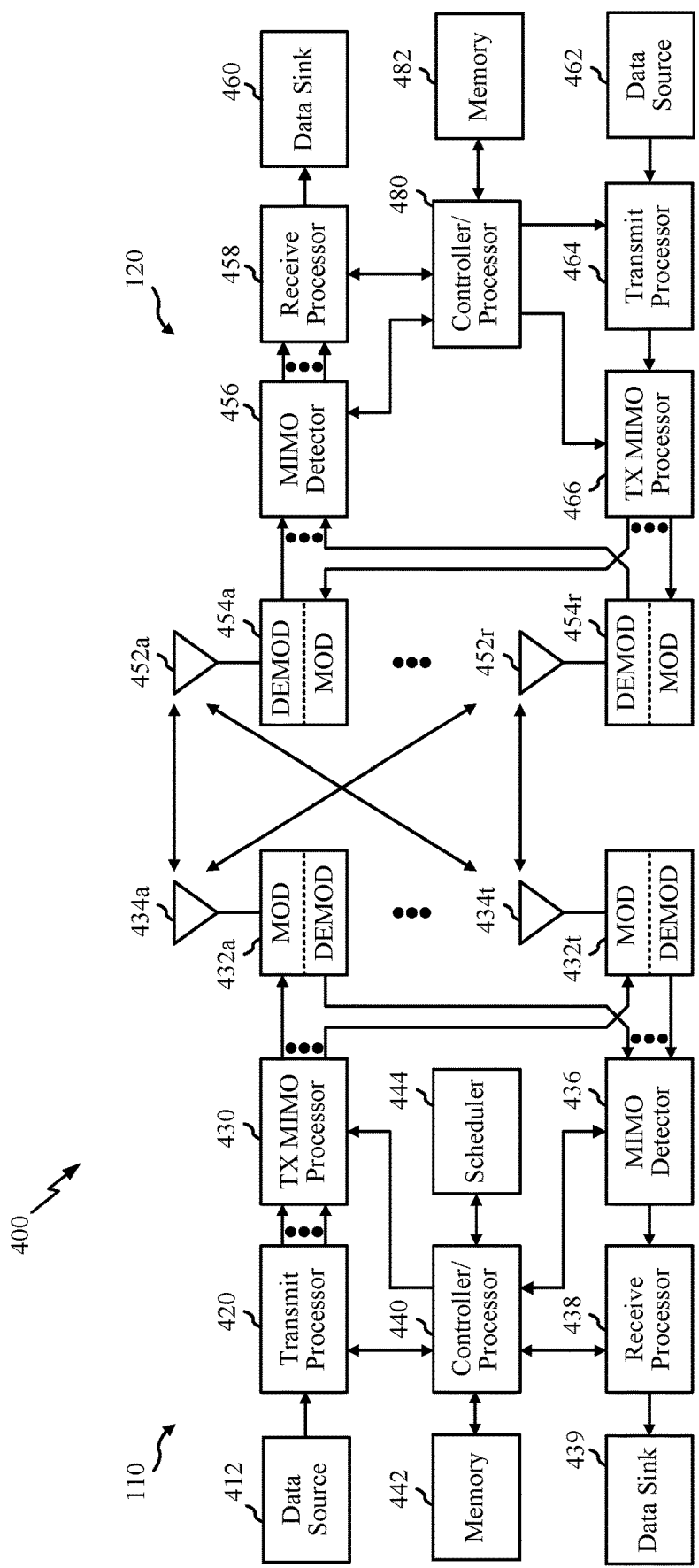
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

One or more components of the BS 110 and UE 120 may be used to practice aspects of the present disclosure. For example, antennas 452, DEMOD/MOD 454, processors 466, 458, 464, and/or controller/processor 480 of the UE 120 and/or antennas 434, MOD/DEMOD 432, processors 420, 430, 438, scheduler 444, and/or controller/processor 440 of the BS 110 may perform the operations described herein and illustrated with reference to FIGS. 7-11.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 8, and/or other processes for the techniques described herein and those illustrated in the appended drawings. A scheduler 444 may schedule UEs for data transmission on the downlink and/or uplink. The processor 480 and/or other processors and modules at the UE 120 may perform or direct, e.g., the execution of the functional blocks illustrated in FIGS. 9 and 10, and/or other processes for the techniques described herein and those illustrated in the appended drawings. The memories 442 and 482 may store data and program codes for the BS 110 and the UE 120, respectively.

Figure 5:
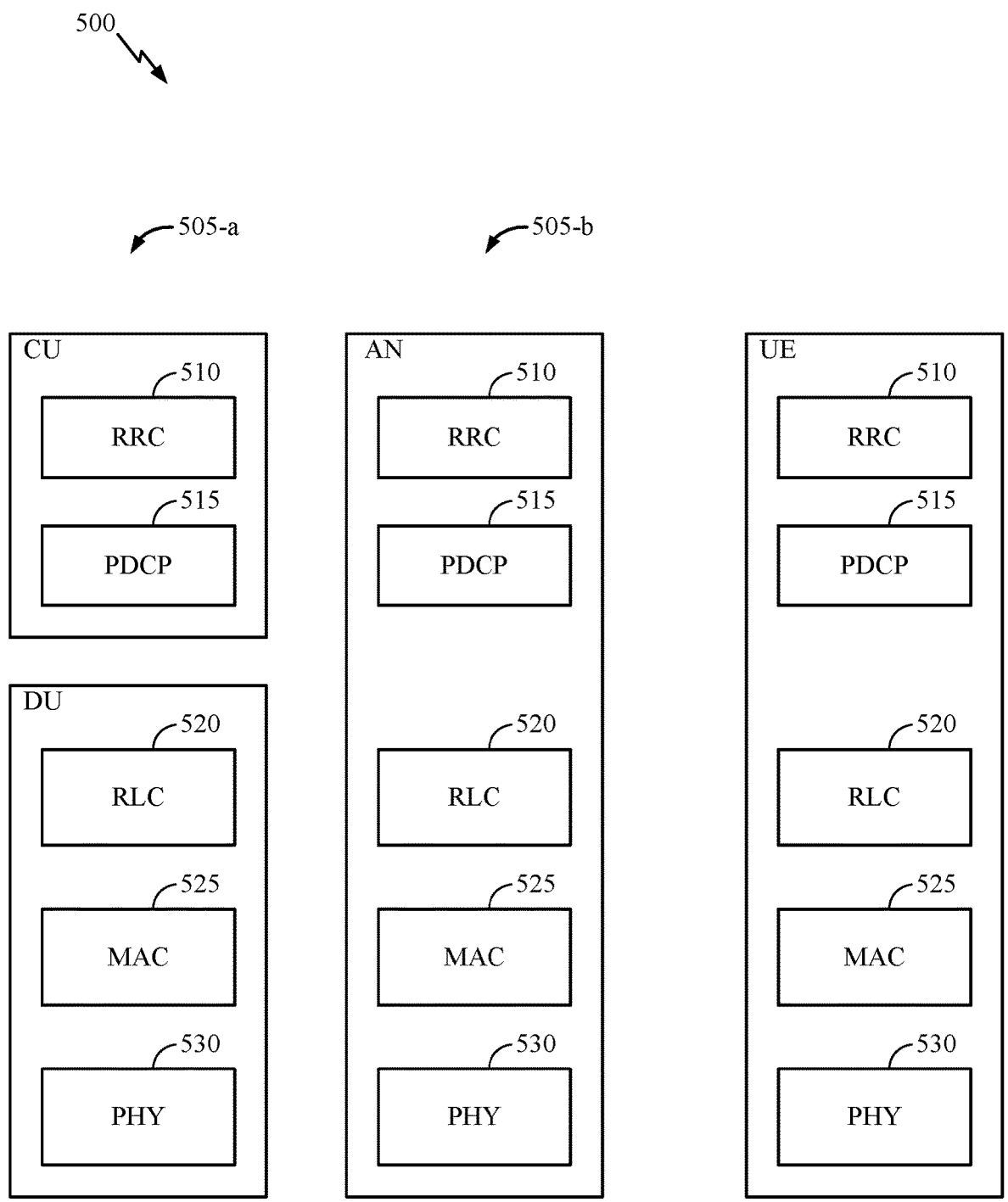
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
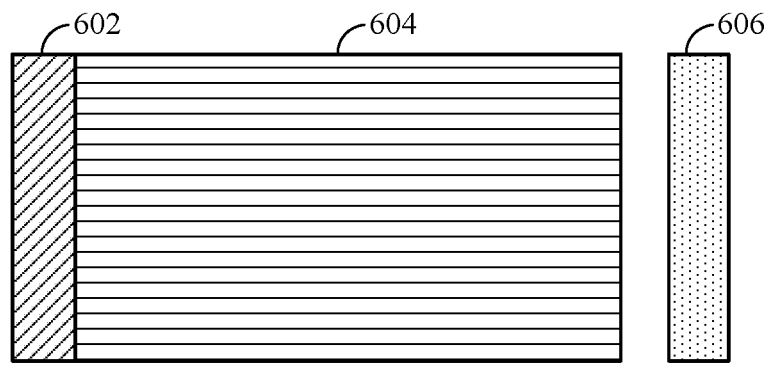
FIG. 6a illustrates an example of a DL-centric subframe, in accordance with certain aspects of the present disclosure.

FIG. 6a is a diagram 6a showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6a. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6a, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
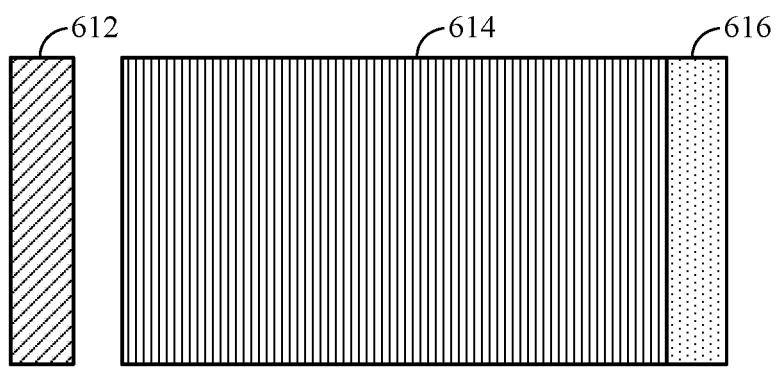
FIG. 6b illustrates an example of an UL-centric subframe, in accordance with certain aspects of the present disclosure.

FIG. 6b is a diagram 6b showing an example of an UL-centric subframe. The UL-centric subframe may include a control portion 612. The control portion 612 may exist in the initial or beginning portion of the UL-centric subframe. The control portion 612 in FIG. 6b may be similar to the control portion described above with reference to FIG. 6a. The UL-centric subframe may also include an UL data portion 614. The UL data portion 614 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 612 may be a physical DL control channel (PDCCH).

As illustrated in FIG. 6b, the end of the control portion 612 may be separated in time from the beginning of the UL data portion 614. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 616. The common UL portion 616 in FIG. 6b may be similar to the common UL portion 606 described above with reference to FIG. 6a. The common UL portion 616 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example NR Procedure for Shared Spectrum

Shared spectrum may include the use of an unlicensed radio frequency spectrum. Example deployment scenarios for a shared spectrum may include operator-based deployments, a stand-alone mode of operation, and/or a dual-connectivity mode of operation. In an operator-based deployment, multiple operators may share a same frequency band. A stand-alone mode of operation may include inter-public land mobile network (PLMN) handover from a licensed carrier. A dual-connectivity mode of operation may include connectivity to a shared spectrum component carrier and to an anchor carrier on licensed spectrum.

Access in Unlicensed Spectrum

Medium access in an unlicensed spectrum may involve a dynamic listen before talk (LBT) procedure. Dynamic LBT procedures may allow sharing of network resources (e.g., frequency resources) on millisecond time scale. However, access to the medium may not be guaranteed, for example, in an asynchronous system. For asynchronous operation, the BSs (e.g., transmitters) may have different frame timings and transmissions from different BSs may not be aligned in time (e.g., one or more subframe and/or frame boundaries of different transmitters may not be contemporaneously aligned).

A Wi-Fi asynchronous system design may be optimized for dynamic LBT procedures. In a Wi-Fi system, beacon transmissions (overhead signals, reference signals) may be subject to LBT. The periodic beacon signals may be "asynchronous" in nature. Beacon transmissions may not be transmitted frequently and receiving stations (STAs) may trigger asynchronous transmission of beacons in a Wi-Fi system.

STA-based mobility may be needed in an effort to compensate for poor radio resource management (RRM) due to, for example, the asynchronous nature of beacon transmissions. Data transmissions may each contain a preamble which may be used for synchronization and detection of the data burst.

Access in Licensed Spectrum

In 4G/LTE, medium access may be optimized for the licensed spectrum. Accordingly, a network node "sensing" (e.g., monitoring or listening) to determine whether another network node is occupying a same radio frequency (RF) band before communicating ("talking") on the RF band, in an effort to avoid interference, may not be required. 4G/LTE systems instead use a periodic transmission of overhead signals. RRM procedures exploit the periodic transmission of these overhead signals. Measurement reporting may be utilized for network-controlled mobility that may take into consideration radio conditions and system loading.

Battery life of UEs may be prolonged using a discontinuous reception (DRX) procedure, whereby a UE discontinuously receives information. During a DRX period, a UE may power down most of its circuitry, thereby saving power.

NR may be optimized for licensed spectrum. 4G/LTE may not support a fast on/off procedure, wherein a transmitter-BS may communicate with a wireless device, quickly stop using portions of the spectrum, and quickly reestablish communication; however, NR system designs may support this feature.

Shared Spectrum Medium Access

A shared spectrum may attempt to minimize changes from the operation of the NR licensed spectrum, in an effort to speed-up shared spectrum deployment. The shared spectrum may accommodate periodic transmissions of overhead and/or common channels for transmission of synchronization information, system information, control information, reference signals, and/or any other overhead signals.

While protection of resources used to transmit data/traffic is important, many times additional actions may not be needed to protect data/traffic as there may be no data/traffic for wireless devices. Non-data or non-traffic transmissions, such as overhead transmissions, however, are still periodically transmitted even when no users are being served. For example, a network may still periodically transmit overhead signaling so users may be associated with a usable cell. Accordingly, protection of overhead resources may be beneficial. Notably, overhead transmission may be downlink transmissions or uplink transmissions (e.g., random access for periodical transmission for sounding reference signals).

The shared spectrum may not make many changes to RRM and may exploit a fast on/off procedure. According to one example, a BS may communicate with a wireless device using a portion of the shared spectrum and may stop use of the shared spectrum, for example, to defer to a licensed transmitter. The BS may restart using the spectrum when the licensed transmitter stops use of spectrum resources.

Operation in a shared spectrum may include a network listen function at a BS. Deployments may protect overhead and/or common channels of other deployments. Stated otherwise, a node associated with a first spectrum and first operator may protect overhead and/or common channels transmitted by a node associated with a second spectrum and a second operator. According to aspects, a node associated with a first spectrum and first operator may protect priority data transmitted by a node associated with a second spectrum and a second operator. The high priority data may include high quality of service (QoS) data.

In a shared spectrum, the configuration used by other wireless devices may be learned by detecting and measuring a neighboring Node B's discovery reference signals (DRS) and/or broadcast channel (BCH). A DRS may include, for example, PSS, SSS, CRS, and/or CSI-RS. The shared spectrum may not use an LBT procedure for overhead signals, common channels, and/or high priority data. A UE, operating in a shared spectrum, may perform an LBT procedure in an effort to access non-protected resources.

A Spectrum Access System (SAS) may allocate channels within and across tiers. These tiers may include, in order of priority, (1) incumbent licensees; (2) Priority Access licensees (PALs); and (3) General Authorized Access (GAA) operators. A shared spectrum may complement SAS server functionality with over-the-air mechanisms for channel selection.

In a shared spectrum, UE-assisted reporting may allow the network to improve (e.g., optimize) channel selection and minimize interference caused by "hidden nodes," where wireless devices outside the range of a BS and/or not detected by the BS (e.g., due to an asynchronous timing) may interfere with certain transmissions.

In a shared spectrum having multiple operators, certain transmissions from each node may benefit from being protected from interference by other nodes. For example, discovery signals, reference signals, paging occurrences transmitted by a transmitter associated with a first operator (which may be transmitted using a common or overhead channel), and/or high priority data may be protected from interference from transmissions by another transmitter, which may be associated with a second operator.

Figure 7:
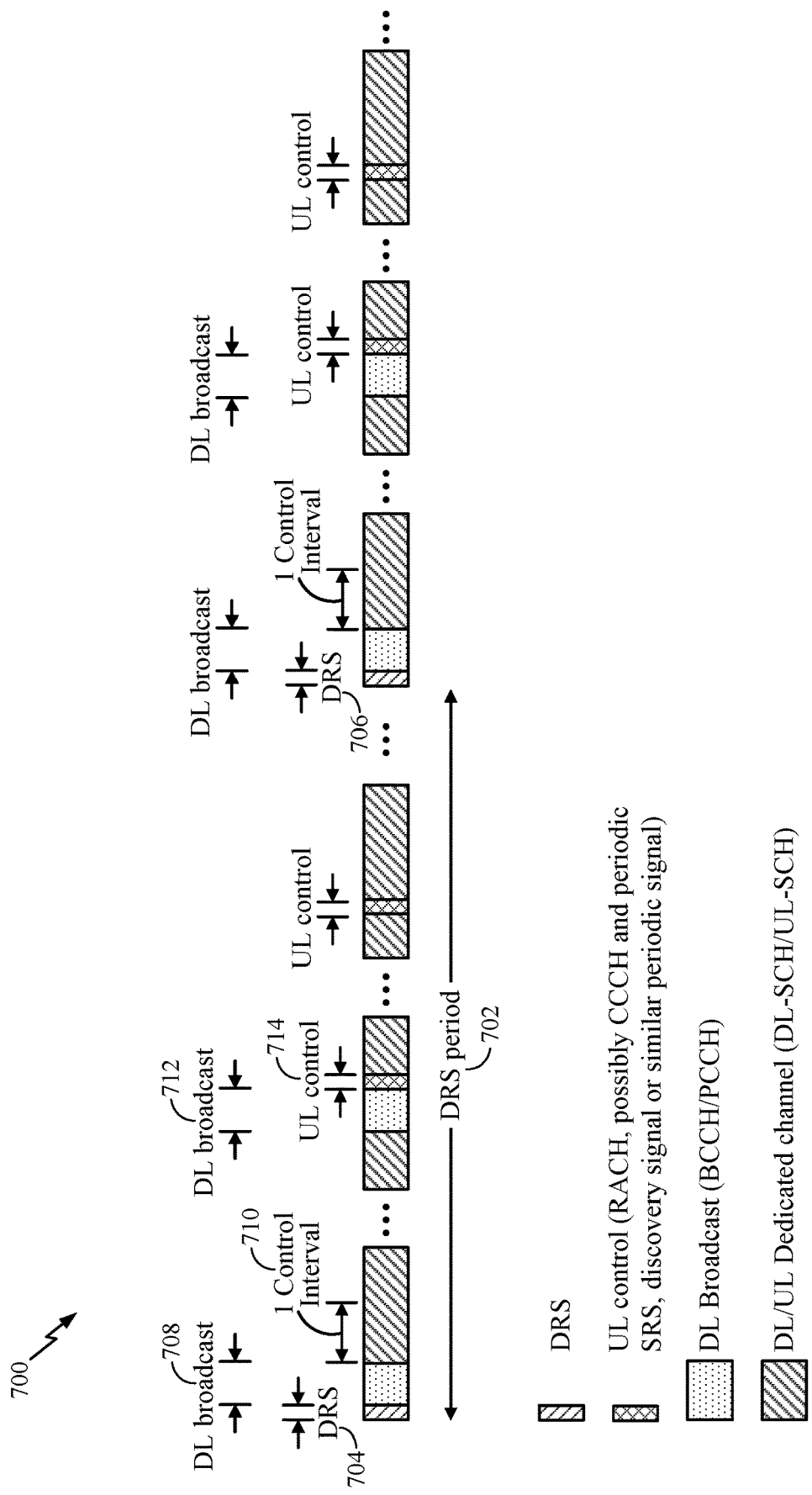
FIG. 7 illustrates an example timeline of overhead and common channels in a shared spectrum.

FIG. 7 illustrates an example timeline 700 of overhead and common channels in a shared spectrum. 702 illustrates an example DRS period, defined by a first DRS 704 and a second DRS 706. A DL broadcast transmission period 708 may follow a first DRS transmission 704. During the DL broadcast transmission 708, a BS may transmit one or more of a broadcast control channel (BCCH) or a paging control channel (PCCH). A control interval 710 may follow the DL broadcast control channel 708. The control interval 710 may include transmissions on a DL shared channel and/or an UL shared channel.

According to one example, the timeline may include a second DL broadcast transmission 712. An UL control transmission 714 may follow the DL broadcast transmission 712. The UL control transmission 714 may include RACH transmissions, common control channel (CCCH) transmission, periodic SRS, discovery signal, and/or other periodic signaling.

In an asynchronous system, a first transmitter associated with a first operator may not detect a second transmitter associated with a second operator. A wireless device, such as a UE, served by the first transmitter, may detect signals transmitted by the second transmitter. As will be described in more detail herein, a UE may detect transmissions from another (e.g., non-serving) transmitter and report, to its serving BS, a configuration of the detected BS. The BS serving the UE may protect transmissions of other transmitters.

According to aspects, a UE served by a first BS associated with a first operator may detect a UE served by a second BS associated with a second operator. The UE may report detection of the UE served by the second BS to its serving, first BS. In response, the first BS may obtain information associated with the second BS from a network server (associated with both the first and second transmitter). According to aspects, the second BS may obtain information associated with the first BS from the network server.

As described above, a BS may receive information regarding neighboring BSs from UEs served by the BS or UEs which are served by other BSs. Additionally or alternatively, the BS may directly communicate with other BSs, using information received from a UE or other wireless devices. As will be described in more detail herein, the BSs may exchange information related to system information or configuration information to facilitate protecting transmissions on overhead or common channels.

Figure 8:
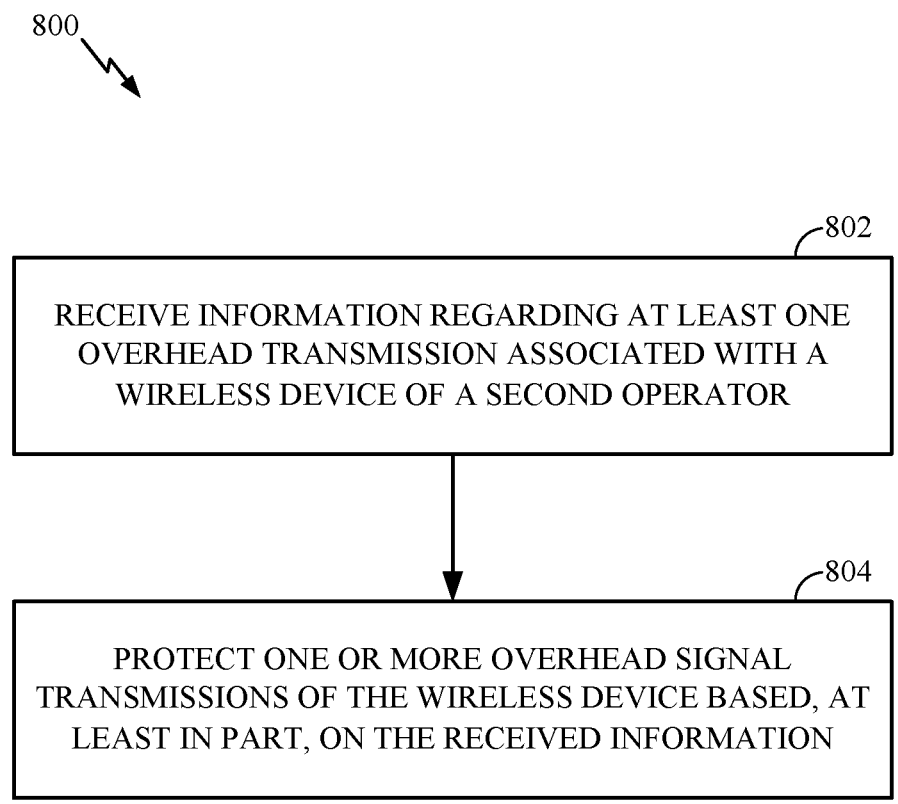
FIG. 8 illustrates example operations, which may be performed by a transmitter, in accordance with aspects of the present disclosure.

FIG. 8 illustrates example operations 800, which may be performed by a transmitter, in accordance with aspects of the present disclosure. The transmitter may operate in a wireless system as illustrated in FIG. 1 and may include one or more components of a BS 110. The BS may be associated with a first operator.

At 802, the BS may receive information regarding at least one overhead transmission associated with a wireless device of a second operator. The information may provide system information associated with the second operator, configuration information of the wireless device, or an identity of the wireless device. At 804, the BS may protect one or more overhead signal transmissions of the wireless device based, at least in part, on the received information.

The BS and the wireless device (e.g., a second BS or a UE acting as a BS) may be asynchronous. Accordingly, the wireless device may be "hidden" to the BS and/or not discoverable by the BS. The BS may receive the information regarding at least one overhead transmission associated with the wireless device from a UE served by the BS, a UE not served by the BS, or the wireless device itself. Receiving the information regarding overhead transmissions may include the BS receiving information regarding at least one of the system information or the configuration information associated with the wireless device from a UE, another BS, or a network server.

The BS may determine system information and/or configuration information associated with the wireless device of the second operator based, at least in part, on the received information. According to aspects, the BS may receive information associated with an identity of the wireless device. The identity may be a global identity. The BS may use the identity to directly communicate with the wireless device itself, in an effort to learn the system information and/or configuration information that the wireless device is using. According to aspects, a UE that receives signals from the wireless device may transmit an identity of the wireless device. This identity may be used by the BS to facilitate backhaul communication between the BS and the wireless device.

In certain scenarios, the information regarding at least one overhead transmission may be received from a network server. For example, a first UE served by the BS of the first operator may detect the presence of a second UE that is not served by the BS of the first operator. The second UE may be served by the wireless device associated with a second operator. The first UE may transmit an indication of the detected second UE to the BS of the first operator. The BS of the first operator and the BS of the second operator may report this information to the network server associated with the BS of the first and the BS second operator. In response, the network server may communicate with the BS of the first operator regarding the overhead signal information of the BS associated with the second operator. Similarly, BS of the second operator may retrieve, from the network server, overhead signaling information associated the BS of the first operator. In response, each of the BSs may protect one or more overhead signal transmissions associated the other BS.

Protecting, by the BS, one or more overhead transmissions of the wireless device may include refraining from transmitting during a future transmission of the wireless device or transmitting during a future overhead transmission of the wireless device using a reduced transmit power. Protecting overhead transmissions may include protecting the overhead signal transmissions of another wireless device for a certain percentage of time. As an example, the transmitter may protect at least one overhead signal transmission of another transmitter 20% of the time. As another example, the transmitter may protect an integer number of transmitters a certain percentage of the time. The transmitter may determine the strongest "N" number of transmitters and protect overhead transmissions associated with the N transmitters for a percentage of time, less than or equal to 100% of the time.

A CET transmission may be an example of an overhead transmission that may be protected by a transmitter as described herein. According to aspects, a BS may schedule CET transmissions for the BS to occur close together (e.g., within a window of time that is less than a threshold value). By scheduling CET transmissions to occur within a small timeframe, other transmitting wireless devices may turn off or reduce transmission power less frequently.

FIG. 9 illustrates example operations 900, which may be performed by a UE, in accordance with aspects of the present disclosure. The UE may operate in a wireless system as illustrated in FIG. 1 and may include one or more components of a UE 120.

At 902, the UE may detect information associated with at least one overhead transmission from a wireless device associated with a first operator. At 904, the UE may transmit the information regarding the detected overhead transmission to a base station (BS) associated with a second operator. According to one example the overhead transmission may be a clear channel assessment (CCA) exempt transmission (CET). More generally, the overhead transmission may be any control or reference signaling associated with synchronization and/or system information.

According to aspects, the UE may not be served by the first BS. In this manner, the UE may report information regarding the detected overhead transmission to a non-serving (e.g., neighboring BS). According to aspects, the UE may be served by the BS and may report information regarding the detected overhead transmission (associated with a neighboring wireless device) to a serving BS.

The UE may decode the information from at least one of downlink discovery signals, downlink paging occasions, uplink random access opportunities, or uplink discovery signals associated with the wireless device. The UE may determine system information and/or configuration information associated with the wireless device based, at least in part, on the detected information. The UE may transmit the information associated with the system information and/or configuration information of the wireless device to the BS.

According to aspects, the UE may transmit, to the BS, information associated with an identity of the wireless device. This may allow the BS and the wireless device to communicate (e.g., via a backhaul) to exchange information related to system information and/or configuration information used by each of the BS and/or the wireless device.

According to aspects, the UE may detect the presence of a wireless device, such as a second BS, served by a different operator than the UE's serving BS. As described above, the UE may detect the presence of another UE, which may be served by the second BS. The UE may report the identity of the second BS and/or the second UE to the UE's serving BS. The serving BS may determine the overhead transmission information from a network server or via direct communication with the second BS.

FIG. 10 illustrates example operations 1000, which may be performed by a UE, in accordance with aspects of the present disclosure. The UE may operate in a wireless system as illustrated in FIG. 1 and may include one or more components of a UE 120.

At 1002, the UE may detect a wireless device of a second operator. At 1004, the UE may report an identification associated with the wireless device to it serving BS.

A UE may assist in a shared spectrum by reporting transmissions received from other UEs. A first UE associated with a first operator may detect uplink transmissions of a second UE associated with a second operator. The detected uplink transmission may include uplink control information. The first UE may report information associated with the second UE's uplink transmissions to the first UE's serving BS. In this manner, the BS serving the first UE may learn timing information associated with the BS serving the second UE (by communicating with the second UE's serving BS, the second UE, or a network server associated with the BS serving the second UE). Accordingly, the BS serving the first UE may attempt to avoid or minimize scheduling the first UE for uplink transmissions which may interfere with reception of overhead signaling by the second UE from its serving BS. In this manner, the BS serving the first UE may reduce interference caused by the first UE's uplink transmission to the overhead transmission transmitted to the second UE.

According to aspects, the BS and the wireless device may be asynchronous. The BS may be unaware of the wireless device. However, a UE may receive signals (and/or interference) from both the BS and the wireless device. Accordingly, the BS may detect neighbor BSs via a network listen. The network listen may occur periodically in an effort to determine new BS and transmissions associated with new BS. Additionally, a UE may transmit information associated with detected BSs.

The BS may protect overhead and common channels of neighboring BSs of other deployments through muting or reducing a transmit power for a percentage of time. As an example, overhead channels may refer to a channel on which a DRS is transmitted. Overhead channels may also refer to UL control channels, used for RACH, CCCH, periodic SRS, discovery signals, and/or other periodic signals. A common channel may refer to DL common channels such as BCCH or PCCH.

Figure 11:
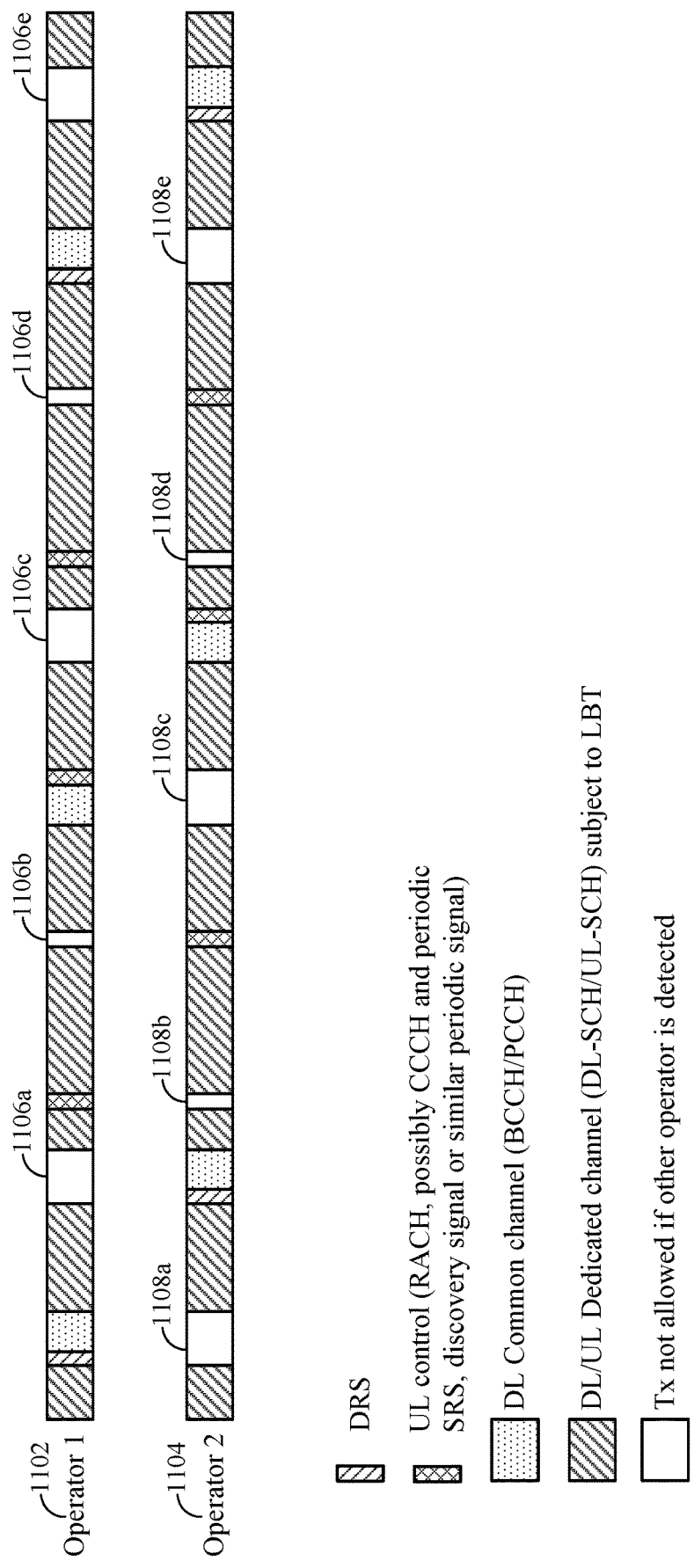
FIG. 11 illustrates an example of protecting transmissions in a shared spectrum, in accordance with aspects of the present disclosure.

As illustrated in FIG. 11, a BS associated with a first operator 1102 may refrain from transmitting during transmissions on overhead and common channels by the second BS associated with a second operator, as shown at 1106*a*-1106*e*. Similarly, the second BS may refrain from transmitting during transmissions on overhead and common channels by the first BS as shown at 1108*a*-1108*e*. The NR design may advantageously allow configuration of overhead and common channels in a "concentrated" manner, in an effort to more efficiently allow devices to mute to protect transmissions from other BS. While FIG. 11 illustrates no transmissions by a BS at 1106a-1106e and 1108a-1108e, a BS may transmit at a lower power or reduce transmit power for a percentage of time, as described above.

While not illustrated in FIG. 11, according to aspects, one or more of the BSs 1102 and 1104 may refrain from transmitting or transmit at a reduced power level when another transmitter is transmitting high QoS (e.g., priority data). In this manner, priority data of another transmitter is protected.

As described above, in accordance with aspects described herein, NR system design may minimize overhead and common channels transmission time. DRS may be used for RRM and PHY layer procedures. The DRS/BCH overhead in NR may be 72 μs per DRS/BCH period for 250 μs subframe. As illustrated in FIG. 11, according to aspects, overhead and common channels may be adjacent to each other to minimize the amount of muting and/or reducing in transmit power by neighboring transmitters. The RACH overhead may be 172 μs per RACH period for 250 μs subframe. Paging SIB occasions may be relatively infrequent. Accordingly the overhead for paging may be insignificant.

With reference to an LBT procedure, each maximum channel occupancy time may be preceded with a preamble. A neighboring BS may decode the maximum channel occupancy time (MCOT) for protection of UL reception at a serving BS. The UE may optionally append indication of transmission time in an effort to provide protection from hidden node interference from a BS. In the case of contention based access on UL, preamble transmission may reduce probability of collision between BS and UE.

According to aspects of the present disclosure, a shared spectrum design may leverage NR licensed spectrum design in an effort to timely deploy CET of overhead and/or common channels. The shared spectrum design may define a percentage of time CET is allowed. As described herein, aspects protect overhead and common channels of neighboring BSs of other deployments through muting and or reducing transmit power by a BS. A BS may detect neighboring BS through system listen mode and UE reporting.

According to aspects, resources for data communications (e.g., minimum resources) may be protected as well. For example, data communications before RRM may be protected. As described above, the NR design may allow for a configuration of overhead and common channels in concentrated manner in an effort to protection by neighboring transmitters. Enhanced Interference Mitigation & Traffic Adaptation (eIMTA) may be utilized in an effort to handle hidden node interference. LBT may be used to enable sharing of the spectrum for user data.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product/computer readable medium for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a user equipment (UE), comprising:
   detecting information associated with at least one overhead transmission from a wireless device associated with a first operator that is different from an operator associated with the UE, wherein the at least one overhead transmission includes:
      at least one of synchronization information from the wireless device or system information from the wireless device; and
      an indication of a transmission time associated with the at least one overhead transmission to reduce hidden node interference; and transmitting the detected information to a base station (BS) associated with a second operator.

2. The method of claim 1, wherein the UE is not served by the BS.

3. The method of claim 1, wherein the detecting information associated with the overhead transmission comprises:
   decoding information from at least one of downlink discovery signals, downlink paging occasions, uplink random access opportunities, or uplink discovery signals associated with the wireless device.

4. The method of claim 1, wherein the information includes at least one of the synchronization information or the system information.

5. The method of claim 1, wherein the information comprises an identity of the wireless device.

6. An apparatus for wireless communication by a user equipment (UE), comprising:
   at least one processor configured to:
      detect information associated with at least one overhead transmission from a wireless device associated with a first operator that is different from an operator associated with the UE, wherein the at least one overhead transmission includes:
         at least one of synchronization information from the wireless device or system information from the wireless device; and
         an indication of a transmission time associated with the at least one overhead transmission to reduce hidden node interference; and
      transmit the detected information to a base station (BS) associated with a second operator; and
   a memory coupled to the at least one processor.

7. The apparatus of claim 6, wherein the UE is not served by the BS.

8. The apparatus of claim 6, wherein the detecting information associated with the overhead transmission comprises:
   decoding information from at least one of downlink discovery signals, downlink paging occasions, uplink random access opportunities, or uplink discovery signals associated with the wireless device.

9. The apparatus of claim 6, wherein the information comprises at least one of the synchronization information or the system information.

10. The apparatus of claim 6, wherein the information comprises an identity of the wireless device.

11. An apparatus for wireless communication by a user equipment (UE), comprising:
    means for detecting information associated with at least one overhead transmission from a wireless device associated with a first operator that is different from an operator associated with the UE, wherein the at least one overhead transmission includes:
       at least one of synchronization information from the wireless device or system information from the wireless device; and
       an indication of a transmission time associated with the at least one overhead transmission to reduce hidden node interference; and
    means for transmitting the detected information to a base station (BS) associated with a second operator.

12. A non-transitory computer-readable medium for wireless communication by a user equipment (UE), comprising:
    instructions that, when executed by at least one processor, cause the at least one processor to:
       detect information associated with at least one overhead transmission from a wireless device associated with a first operator that is different from an operator associated with the UE, wherein the at least one overhead transmission includes:
          at least one of synchronization information from the wireless device or system information from the wireless device; and
          an indication of a transmission time associated with the at least one overhead transmission to reduce hidden node interference; and
       transmit the detected information to a base station (BS) associated with a second operator.

13. The method of claim 1, wherein the second operator is associated with the UE and the UE is served by the BS.

14. The apparatus of claim 7, wherein the second operator is associated with the UE and the UE is served by the BS.

* * * * *